United States Patent

Naaktgeboren et al.

[11] Patent Number: 5,976,012
[45] Date of Patent: Nov. 2, 1999

[54] FEEDER MEANS FOR A FORAGE HARVESTER

[75] Inventors: Adrianus Naaktgeboren, Varsenare; Dirk J. Desnijder, Wondelgem; Fernand A. C. Van Kerschaver, Oedelem, all of Belgium

[73] Assignee: New Holland North America, Inc., New Holland, Pa.

[21] Appl. No.: 09/046,339

[22] Filed: Mar. 23, 1998

[30] Foreign Application Priority Data

Mar. 27, 1997 [GB] United Kingdom .................. 9706454

[51] Int. Cl.⁶ ........................................... A01F 12/00
[52] U.S. Cl. ..................... 460/113; 56/505; 56/16.4 B
[58] Field of Search .................... 460/113, 114, 460/116, 28; 56/504, 505, 16.4 B, 16.4 C, 16.4 D; 241/101.77, 230, 101.2

[56] References Cited

U.S. PATENT DOCUMENTS

| | | | |
|---|---|---|---|
| 4,821,494 | 4/1989 | O'Halloran et al. | ................ 56/16.4 B |
| 5,152,127 | 10/1992 | Koegel et al. | ....................... 56/16.4 B |
| 5,630,313 | 5/1997 | Von Allworden et al. | .......... 56/16.4 B |

FOREIGN PATENT DOCUMENTS 997485  8/1965  United Kingdom .

*Primary Examiner*—H. Shackelford
*Attorney, Agent, or Firm*—Frank A. Seemar; Larry W. Miller; J. William Stader

[57] ABSTRACT

A forage harvester is provided with a front unit, comprising a rotatable cutterhead to which crop material is fed by feeding apparatus comprising stationary lower feedrolls and movable upper feedrolls. The upper feedrolls are suspended from the feeder frame by a pair of belts, which define the lowermost position of the movable feedrolls, under conditions where no or very little crop is introduced into the harvester. Inevitable accumulation of crop material or dirt on the components of the feeding apparatus will not influence the position to which the feedrolls may be lowered. A steady and even flow of crop material to the cutterhead can hence be maintained, even when little material is introduced.

12 Claims, 3 Drawing Sheets

FEEDER MEANS FOR A FORAGE HARVESTER

FIELD OF INVENTION

The present invention relates generally to forage harvesters, and more particularly to feeder means for feeding crop material towards a rotating cutterhead, in which feeder means a movable portion is loaded for compressing the incoming material into an even mat and retainer means determine the outer position of the movable portion.

BACKGROUND OF INVENTION

A forage harvester usually is equipped with a detachable crop collecting apparatus, such as a row crop attachment or a pick-up device, which takes the crop off the field and feeds it to the inlet of the front unit of the forage harvester. In order to obtain good chopping quality, i.e. comminution of the crop material to a constant chop length, an even mat of crop material has to be fed at a constant speed towards the cutterhead to be comminuted between the rotating knives of the cutterhead and a stationary shearbar. The chopped material is fed into a blower unit with paddles, which throw it up into a discharge spout for collection in a cart or container.

Commonly, the mat of crop material is formed between stationary lower feedrolls and movable upper feedrolls, which are mounted for vertical displacement inside the front unit. The upper feedrolls are forced downwardly by a pair of springs for compression of the crop incoming material. Retainer means have to be provided to prevent interference of the upper and lower feedrolls when no material is being fed into the forage harvester and the upper rolls are in their lowermost position. Furthermore the shafts of the feedrolls which extend through apertures in the feedroll housing, must not contact the edges of the apertures to prevent undue wear of the components. Hence a supporting rim below these shafts cannot be used for limiting the downward travel of the feedrolls.

Most commonly abutments are provided on the feeder frame below the bearing housings or gearboxes of the upper feedrolls for halting the latter in a position suitably remote from the lower feedrolls. Such abutments may be equipped with rubber bumpers to cushion the downward motion of the feedrolls. Alternatively bumpers may also be provided on the bearing housings or gearboxes.

It has been experienced that the flat surfaces of the abutments have to be cleaned at regular intervals in order to preserve the original minimum distance between the upper and lower feedrolls. Otherwise the accumulation of stray crop material and dirt on the abutments prevents that the upper feedrolls return to their original lowermost position. Under these circumstances the feedrolls are no longer capable of providing a regular flow of crop material to the cutterhead as soon as the flow rate decreases and the thickness of the mat between the feedrolls diminishes accordingly. Consequently the cutterhead is loaded in an irregular manner and no constant chop length can be realized or maintained.

SUMMARY OF THE INVENTION

Therefore it is an object of the present invention to deal with the problems mentioned above and to provide a feeder structure wherein the position of the movable feedrolls closest to the stationary feedrolls is positively defined by retainer means which are not influenced by pollution caused by stray crop material and dirt.

In pursuance of this and other important objects the present invention provides for improvements to a forage harvester comprising a main frame, cutterhead frame means mounted thereto and enclosing a rotatable cutterhead, operable to comminute crop material conveyed thereto, feeder means, mounted within the cutterhead frame means and operable to convey crop material rearwardly along a crop feeding path towards the cutterhead, the feeder means comprising a portion which is movable between a position adjacent the crop feeding path and a position remote therefrom, load means for thrusting the movable portion in the direction of the crop feeding path, and retainer means determining the outer position to which the movable portion can be thrust by the load means.

More specifically, the invention contemplates a retainer comprising linkage means which are stretched when the movable portion is in the outer position and are slackened when the movable portion is moved to a position remote therefrom.

The linkage means may comprise a belt, preferably made out of reinforced material. The outer position of the movable feeder portion may be defined by one or more endless continuous belts which encompass an adjustable support attached to the feeder frame and a transverse member of the retainer means. The use of such closed belts has definite advantages over suspension from single belt stretches as they do not require special precautions for preventing the stretches from slipping out of their attachment points to the frame and the feeder structure.

The linkage means preferably are mounted between the movable feeder portion and a frame structure which can be moved in unison with the feeder portion to a position remote from the fixed feeder portion. Access to the linkage means for inspection and replacement can then easily be realized by moving the frame to the remote position.

As the functioning of the linkage means is not influenced by crop material sticking thereto, it is permitted to install them inside the feeder frame, remote from the actual crop flow, thereby requiring no extra space for supplementary components outside the feeder housing.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
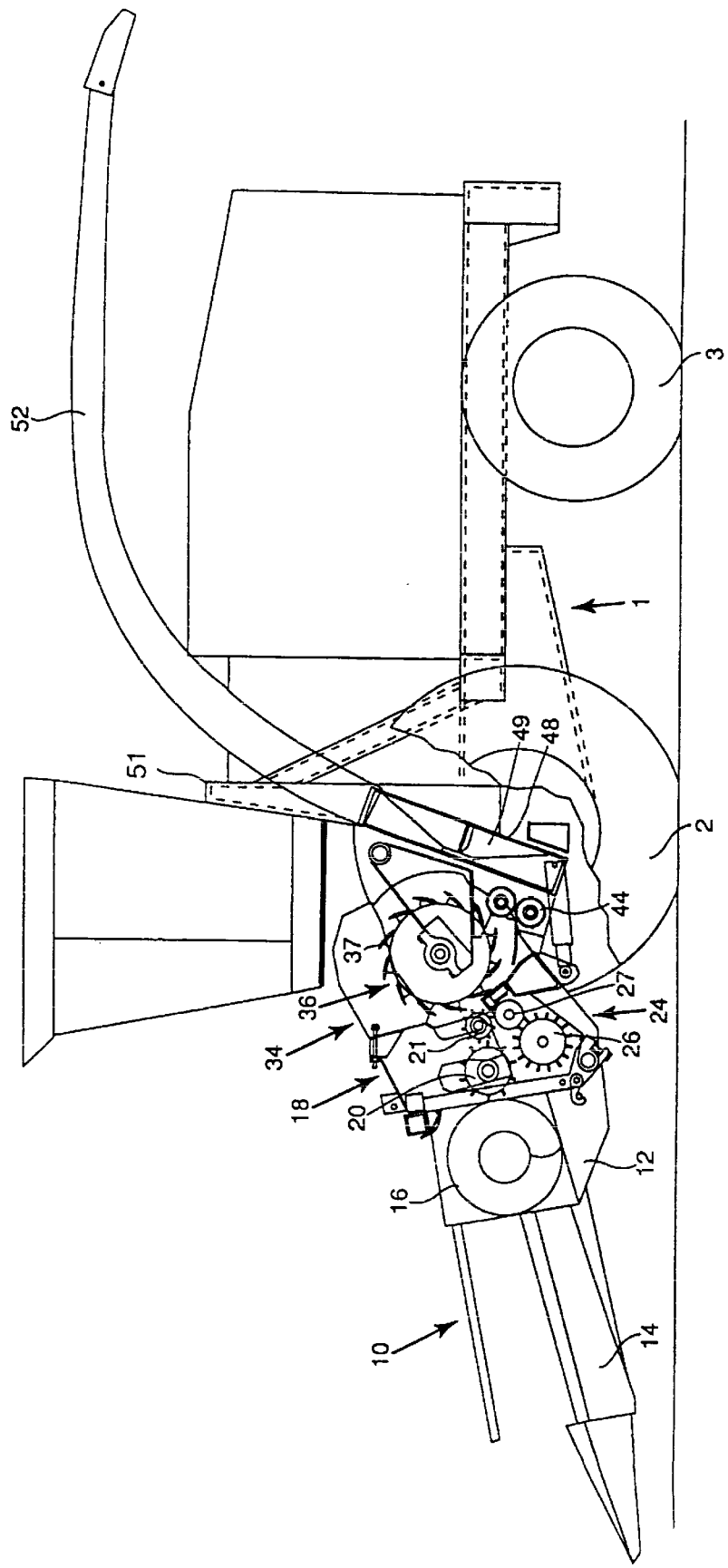
FIG. 1 is a side elevational view of a forage harvester, comprising a front unit mounted to a main frame and a crop collecting apparatus.

FIG. 1 shows a forage harvester having a main frame to which are mounted ground engaging traction wheels 2 and steering wheels 3. The forage harvester is shown equipped with a crop collecting apparatus, in the form of a row crop attachment 10, suitable for the harvesting of corn, but which can be replaced with a conventional windrow pick-up device or a conventional cutter bar attachment, depending on the type of crop to be harvested. Customarily the row crop attachment 10 comprises an attachment frame 12, which supports a plurality of row crop units 14, operable to harvest corn stalks from the field and to convey the same rearwardly to an auger 16 which in its turn delivers the crop material to the bite of feeder means installed in a front unit of the forage harvester.

Figure 2:
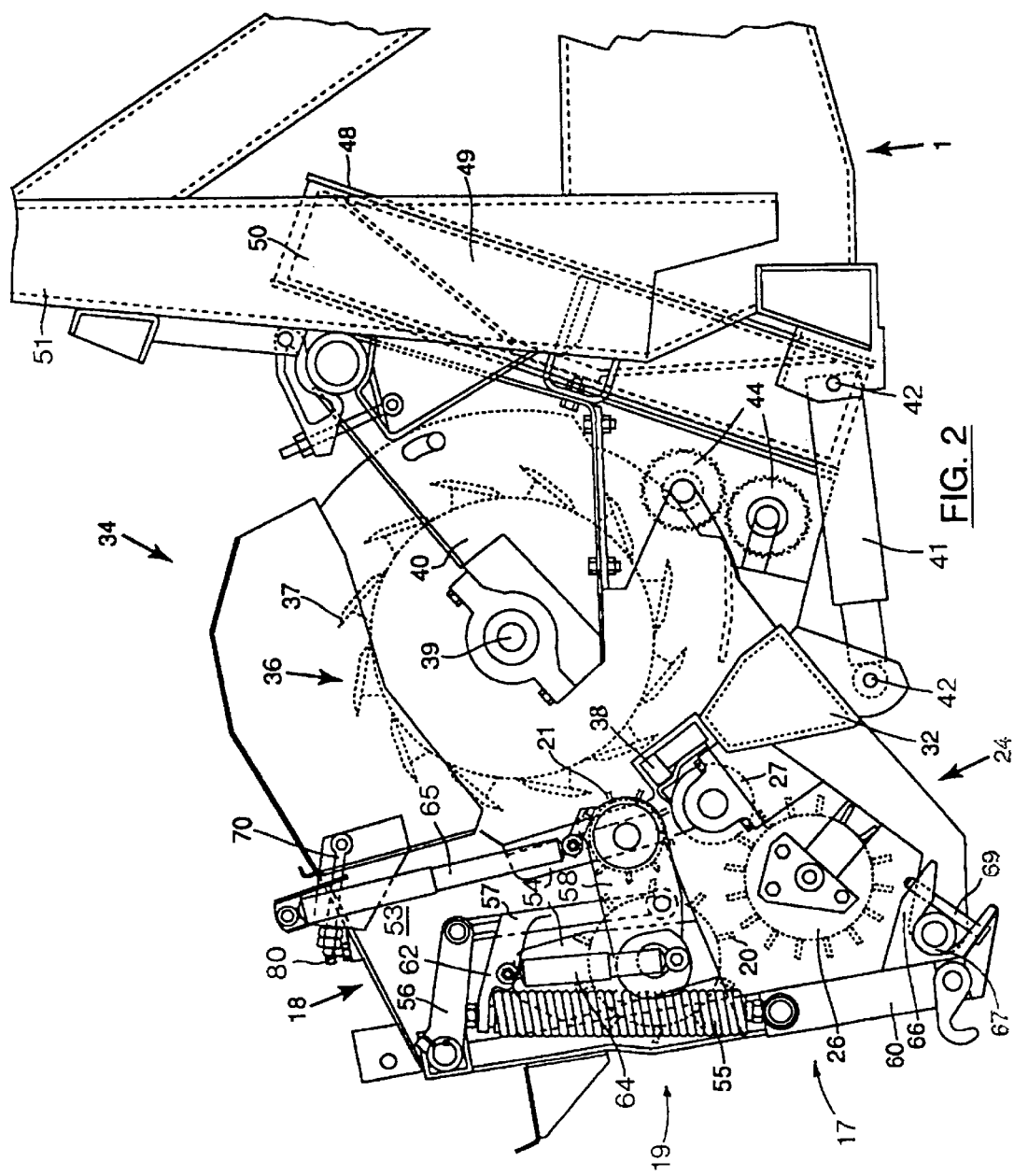
FIG. 2 is a n enlarged side view of the front unit and a portion of the main frame.

As shown in FIG. 2, said feeder means comprise lower feeder means 17, constituted by a front lower feedroll 26, and a smooth, rear lower feedroll 27, and upper feeder means 19, constituted by a front upper feedroll 20 and a rear upper feedroll 21. The lower feedrolls 26, 27 are rotatably mounted in a lower feeder frame 24 welded to a transverse beam 32 of a cutterhead frame 34, and the upper feedrolls 20, 21 are mounted in an upper feeder frame 18, to which the row crop attachment 10 is attached.

The feedrolls 20, 21, 26, 27 rotate to convey the crop material along a crop feeding path between the lower and upper feeder means 17, 19 to a cutterhead 36 which comprises a plurality of knives 37, generating a cylindrical peripheral shape or profile when the cutterhead 36 is rotated about its axle 39. The knives 37 cooperate with a fixed shearbar 38 to cut the crop material to length and project it into the bite of a set of counter-rotating crop processor rolls 44, which crack any kernels which may be left in the chopped material and deliver the whole to a blower rotor 49 which is installed within a blower housing 48, attached to vertical beams 51 of the main frame 1. The blower rotor 49 comprises a plurality of paddles 50, which throw the material upwardly through the blower outlet into a discharge spout 52 (FIG. 1), which can be positioned by an operator to direct the cut crop material as required, normally into a wagon which is moving alongside or behind the forage harvester.

The cutterhead axle 39 is journaled on a pair of cutterhead supports 40 of a generally triangular shape, attached to the vertical frame beams 51. The cutterhead frame means, comprising the cutterhead frame 34, the lower feeder frame 24 and the upper feeder frame 18, are mounted for pivotal movement about the same axle 39. The position of this assembly relative to the main frame 1 is controlled by a pair of hydraulic cylinders 41, which are mounted by means of pins 42 between the transverse beam 32 of the cutterhead frame 34 and the main frame 1.

The upper feeder frame 18 comprises left and right hand side plates 53, each having two substantially vertical apertures 54 through which extend the shafts of the upper feedrolls 20, 21. The outer ends of said shafts are received in bearing housings 58, which are movably linked to the upper feeder frame 18 by left and right hand sets of crank arms 56 and load arms 57. The crank arms 56 are mounted for pivotal movement to a front portion 60 of the upper feeder frame 18, which registers with the outlet of the row crop attachment 10. The rear end of each arm 56 is hingeably linked to the load arm 57, whereof the lower end is pivotally mounted to the bearing housing 58.

Each load arm 57 comprises a forwardly extending member 62 to which is mounted the upper end of a helical spring 55, whereof the lower end is pivotally mounted to the sides of the front portion 60 of the upper feedroll frame 18. The springs 55 force the load arms 57, the bearing housings 58 and the upper feedrolls 20, 21 downwardly to the crop feeding path and rearwardly to the cutterhead 36.

A first motion damper 64 is installed between the front portion of the bearing housing 58, in the vicinity of the front upper feedroll 20, and the forwardly extending member 62 of the load arm 57. A further damper 65 is mounted between the rear portion of the bearing housing 58, in the vicinity of the rear upper feedroll 21, and a stud welded to the top of the upper feeder frame 18. Both dampers 64, 65 may be hydraulic shock absorbers having distinct damping characteristics when elongated or when shortened.

The lower end of the front portion 60 comprises a pair of bifurcated extensions 66, fitting over a transverse cylindric beam 67 of the lower feeder frame 24. The bifurcated extensions 66 are pivotally secured to the beam 67 by means of pins 69. The top of the upper feeder frame 18 is held against the cutterhead frame 34 by a pair of eyebolts 70, attached to the sides of the latter frame 34.

Figure 3:
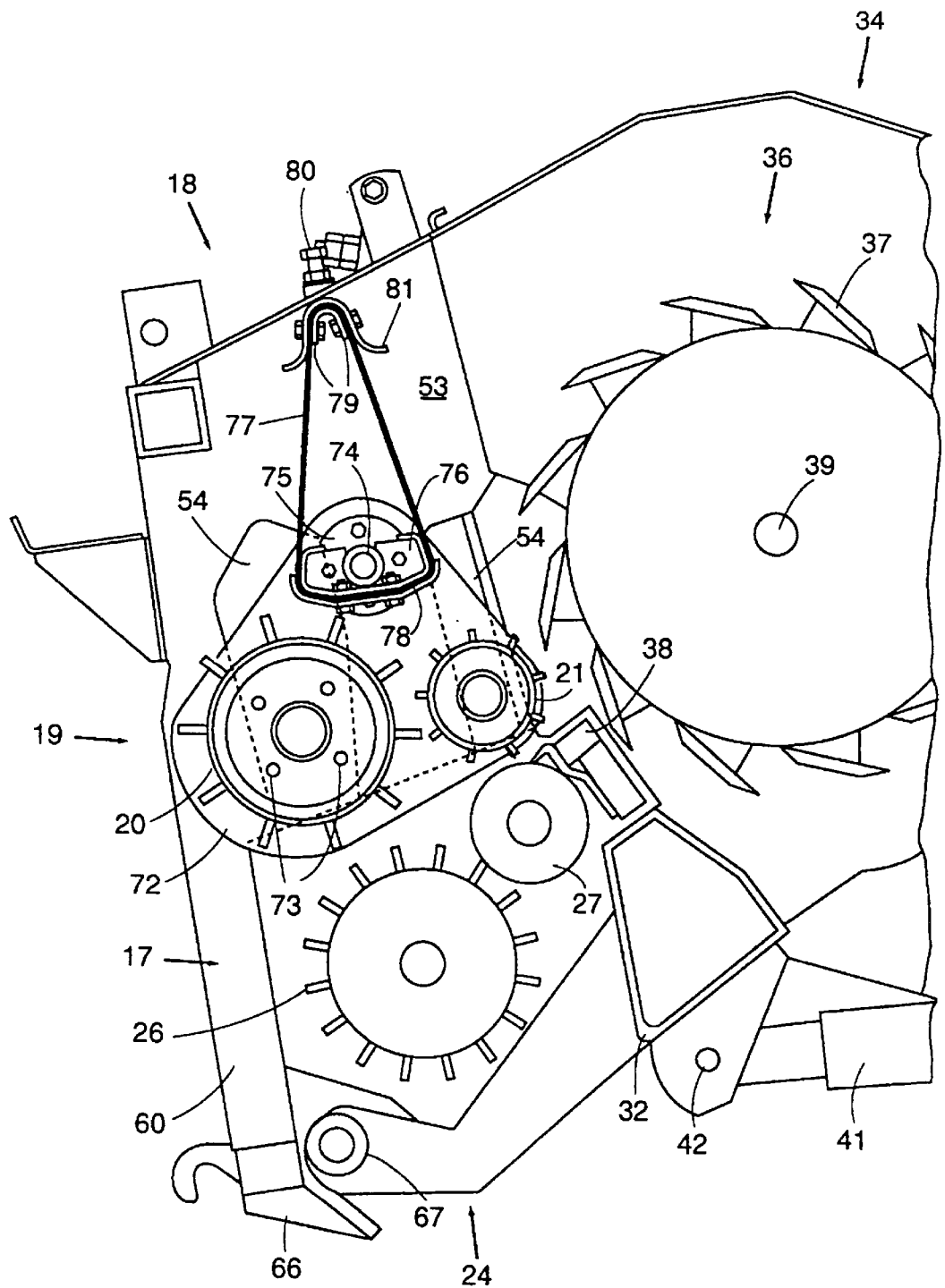
FIG. 3 is a cross section of the front unit of FIG. 2.

As shown in FIG. 3, the upper feeder means 19 also comprise a pair of side plates 72 which are affixed by bolts 73 to the bearing housings 58 and extend adjacent the inner sides of the upper feeder frame 18. These plates 72 are moved in unison with the housings 58 and the feedrolls 20, 21 and close off at least partially the apertures 54 in the side plates 53 of the upper feeder frame 18. The side plates 72 of the feeder means 19 are interconnected by a transverse tube 74 positioned above the feedrolls 20, 21. The tube 74 is removably affixed to the upper feeder means 19 via a pair of flanges 75 welded onto the tube ends. A generally cradle-shaped spreader 76 is welded onto the tube 74 beside each flange 75, the longest part of the spreader 76 extending in the for-and-aft direction. Continuous, endless belts 77 next to each side plate 53 encircle the spreaders 76 and are clamped thereto by braces 78. The belts 77 preferably are rectangular in cross-section and may be reinforced by a high-resistance material such as aramid webbing.

The top portion of the belts 77 is swung around a profile 79 which is adjustably attached to the top of the upper feeder frame 18 by means of adjustment screws 80. The belts 77 are kept in place by a second set of braces 81 which clamp the belts 77 onto the profile 79. The long ears of the braces 81 prevent damage to the belts 77 when the feeder means 19 are lifted up and the belts 77 curve upwardly and outwardly.

The belt suspension is used to define the lowermost position of the movable feeder means 19. As the springs 55 force the bearing housings 58 and the feedrolls 20, 21 downwardly, the front and rear portions of the belts 77 are stretched. The front and rear parts of the cradle spreaders 76 are dimensioned as to make the front and rear belt portions, when stretched, extend from the profile 79 in the direction of the axis of the front and rear feedroll 20, 21 respectively. The general inclination of the upper feeder means 19 may be varied by sliding the upper portion of the belt 77 slightly forwardly or rearwardly over the supporting profile 79. Most advantageously the feedrolls 20, 21 are oriented such that the gap between the rear feedrolls 21, 27 is substantially smaller than the gap between the front feedrolls 20, 26, thereby progressively compressing the crop material which is fed to the cutterhead 36. Swinging movement of the upper feeder means 19 about the profile 79 is precluded by the narrow fit of the rear portion of the bearing housings 58 in the rear apertures 54.

The minimum distance between the rear feedroll 21 and the smooth feedroll 27 is adjusted by lowering or raising the profile 79 by means of the screws 80. For most crops a minimum distance of about 7 mm has proven to be most satisfactory. When no crop material is fed into the forage harvester, the position of the movable feedrolls 20, 21 is defined by the lengths of the front and rear belt stretches. When crop material is delivered thereto by the attachment 10, it will be compressed into an even mat under action of the springs 55 and the feedrolls 20, 21. The latter are permitted to raise when the height of crop mat increases while the belt 77 is slackened. Irregular feeding may cause the rear or front belt stretch to tension while the other remains slackened. It is no longer required to provide abutments for limiting the downward travel of the movable feedrolls 20, 21.

The movement of the feedrolls 20, 21 is not hindered in any manner by the pollution of the suspension structure caused by crop material sticking to the belts 77 or the cradle 76. Accumulation of dirt thereon does not influence the stretching or slackening of the belts 77. The front and rear belt portions are always stretched to their full lengths when the forage harvester is running empty.

When no crop collecting apparatus is attached to the front portion 60, access can be gained to the upper feeder frame 18 for installation, inspection or replacement of the belts 77 by loosening the eyebolts 70 at the top of the feeder frame 18 and tilting the latter forwardly about the cylindric beam 67. The top of the front portion 60 may rest on the ground or on any kind of support placed in front of the front unit.

As the belts 77 are installed between the top of the frame 18 and the upper feeder means 19, which are also moved in unison with the frame, there is no need for their disconnection or readjustment when the frame 18 is removed from or reinstalled on the front unit.

Other embodiments of the present invention can be thought of without departing from the original idea of the invention. For example, the endless belt 77 may also be replaced with two distinct portions of belt material, or with other flexible suspension means which slacken when the feedrolls are lifted up, such as chains or sets of hinged rods.

It is also conceivable to use only one stretch of belt or other stretchable material for limiting the travel of the movable feeder means 19. The invention may also be used in feeder arrangements wherein the lower feedrolls 26, 27 are movable and thrust toward the crop path for compressing the incoming crop material. In this case the upward movement of the rolls may be limited by belts installed below the feedrolls 26, 27.

One may also install a pair of belts at the outside of the feeder housing, e.g. between lugs attached to upper feeder frame 18 and the bearing housings 58 of the movable feedrolls 20, 21.

The suspension according to the invention may also be used in feeder units equipped with other types of conveyor means in replacement of the feedrolls.

It will be appreciated that there is provided a structure which on the one hand positively limits the travel of the movable feedrolls towards the other feedrolls and on the other hand is not susceptible to undue restriction of their movement by pollution of the retaining structure.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. A forage harvester, comprising a main frame, cutterhead frame means mounted thereto and enclosing a rotatable cutterhead, operable to comminute crop material conveyed thereto, and feeder means, mounted within said cutterhead frame means and operable to convey crop material rearwardly along a crop feeding path towards said cutterhead, said feeder means comprising a portion which is movable between a position adjacent said crop feeding path and a position remote therefrom, load means for thrusting said movable portion in the direction of said crop feeding path, and retainer means determining the outer position to which said movable portion can be thrust by said load means, the improvement comprising said retainer means comprise linkage means which are stretched when said movable portion is in said outer position, and which are slackened when said movable portion is moved to a position remote from said outer position.

2. A forage harvester as set forth in claim 1 wherein said linkage means include one part affixed to said cutterhead frame means, and another part affixed to said movable feeder portion.

3. A forage harvester as set forth in claim 1 wherein said linkage means comprise at least one belt.

4. A forage harvester as set forth in claim 3 wherein said at least one belt comprises aramid webbing.

5. A forage harvester as set forth in claim 3 said retainer means further comprising support means affixed to said frame means, and a transverse member, and said linkage means comprise at least one endless, continuous belt, encompassing said support means and said transverse member.

6. A forage harvester as set forth in claim 5 wherein said transverse member is removably attached to said movable feeder portion.

7. A forage harvester as set forth in claim 1 wherein said linkage means includes one part affixed to a support means moveable relative to said frame means for adjusting the outer position of said movable feeder portion.

8. A forage harvester as set forth in claim 7 wherein said frame means comprise a frame portion (18) onto which said movable feeder portion is mounted and which can be moved to a position remote from said crop feeding path, and said support means is adjustably affixed to said frame portion.

9. A forage harvester as set forth in claim 8, wherein said linkage means are installed within said cutterhead frame means.

10. A forage harvester as set forth in claim 8 wherein said movable feeder portion comprises shafts extending through apertures in said frame means and side plates at least partially closing off said apertures, and said retainer means are affixed to said side plates.

11. A forage harvester as set forth in claim 1 wherein said movable feeder portion comprises a front feeder means and a rear feeder means, and said linkage means comprise front retaining means and rear retaining means determining the outer position of said front feeder means and of said rear feeder means, respectively.

12. A forage harvester as set forth in claim 11 further comprising front and rear feeder means consisting of front and rear feedrolls, respectively, and wherein said front and rear retaining means, when stretched, extend from a fixation point stationary to said frame means in the direction of the axes of said front and rear feedrolls.

* * * * *